(12) United States Patent
Menon et al.

(10) Patent No.: US 10,893,064 B2
(45) Date of Patent: Jan. 12, 2021

(54) IDENTIFYING SERVICE ISSUES BY ANALYZING ANOMALIES

(71) Applicant: MICROSOFT TECHNOLOGY LICENSING, LLC, Redmond, WA (US)

(72) Inventors: Vinod Mukundan Menon, Bothell, WA (US); Rahul Nigam, Bothell, WA (US); Mark Gilbert, Issaquah, WA (US); Srigopal Chitrapu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/393,343

(22) Filed: Apr. 24, 2019

(65) Prior Publication Data
US 2020/0344252 A1 Oct. 29, 2020

(51) Int. Cl.
| | |
|---|---|
| G06F 16/906 | (2019.01) |
| G06N 20/00 | (2019.01) |
| H04L 29/06 | (2006.01) |
| G06F 16/2457 | (2019.01) |

(52) U.S. Cl.
CPC .... *H04L 63/1425* (2013.01); *G06F 16/24578* (2019.01); *G06F 16/906* (2019.01); *G06N 20/00* (2019.01)

(58) Field of Classification Search
None
See application file for complete search history.

(56) References Cited

U.S. PATENT DOCUMENTS 9,935,990 B1  4/2018  Schulman
2014/0222379 A1  8/2014  Martinez heras et al.
2014/0229768 A1*  8/2014  Bernstein .............. G06F 11/079 714/39

(Continued)

OTHER PUBLICATIONS

"Adjacency Matrix", Retrieved From https://en.wikipedia.org/wiki/Adjacency_matrix, Retrieved Date: Sep. 11, 2018, 6 Pages.

"Cross-correlation", Retrieved From https://en.wikipedia.org/wiki/Cross-correlation#Time_series_analysis, Retrieved Date: Sep. 11, 2018, 6 Pages.

"Decomposition of Time Series", Retrieved From https://en.wikipedia.org/wiki/Decomposition_of_time_series, Retrieved Date: Sep. 11, 2018, 3 Pages.

(Continued)

*Primary Examiner* — Joshua Joo
(74) *Attorney, Agent, or Firm* — NovoTechIP International PLLC

(57) ABSTRACT

A method of and system for identifying one or more outlier anomalies in a computer environment is carried out by collecting data from a computing environment, identifying a plurality of anomalies in the computing environment based in part on the collected data, grouping the plurality of anomalies into one or more clusters, and classifying each of the one or more clusters based on a plurality of dimensions. The method may also include assigning a weight to each dimension of the plurality of dimensions for each of the one or more clusters, aggregating the weights assigned to each dimension to calculate a score for each of the one or more clusters, and generating a ranking for each of the one or more clusters base in part on the calculated score. After the rankings are generated, one of the clusters may be identified as an outlier anomaly based on the rankings. The plurality of dimensions and the weights assigned to each dimension may be selected by employing machine-learning models.

19 Claims, 6 Drawing Sheets

(56) References Cited

U.S. PATENT DOCUMENTS

| | | | |
|---|---|---|---|
| 2016/0204992 | A1 | 7/2016 | Wu et al. |
| 2016/0352603 | A1 | 12/2016 | Vanantwerp et al. |
| 2017/0060656 | A1 | 3/2017 | Bhattacharya et al. |
| 2017/0187570 | A1 | 6/2017 | Estrada et al. |
| 2017/0220407 | A1 | 8/2017 | Estrada et al. |
| 2017/0250855 | A1 | 8/2017 | Patil et al. |
| 2017/0272317 | A1* | 9/2017 | Singla ............. H04L 41/0806 |
| 2018/0316707 | A1 | 11/2018 | Dodson et al. |
| 2019/0268215 | A1* | 8/2019 | Tellado ............ H04L 41/0613 |
| 2019/0306170 | A1* | 10/2019 | Wang .................. G06F 21/604 |
| 2019/0311278 | A1* | 10/2019 | Ryckbosch ......... G06N 5/047 |
| 2019/0342194 | A1* | 11/2019 | Mermoud ........... H04L 43/062 |
| 2020/0112571 | A1* | 4/2020 | Koral ................. G06K 9/6218 |
| 2020/0145304 | A1* | 5/2020 | Wulff ................ G06K 9/6284 |
| 2020/0153616 | A1* | 5/2020 | Savalle ............ H04L 63/0428 |

OTHER PUBLICATIONS

"Linear Trend Estimation", Retrieved From https://en.wikipedia.org/wiki/Linear_trend_estimation, Retrieved Date: Sep. 11, 2018, 6 Pages.

"Statistical Classification", Retrieved From https://en.wikipedia.org/wiki/Statistical_classification, Retrieved Date: Sep. 11, 2018, 5 Pages.

Roy, et al., "PerfAugur: Robust Diagnostics for Performance Anomalies in Cloud Services", In Proceedings of the IEEE 31st International Conference on Data Engineering, Apr. 13, 2015, 12 Pages.

Wren, et al., "Monitor a SharePoint site with Application Insights", Retrieved From https://docs.microsoft.com/en-us/azure/azure-monitor/app/sharepoint, Jul. 11, 2018, 7 Pages.

"International Search Report and Written Opinion Issued in PCT Application No. PCT/US2020/025621", dated Oct. 14, 2020, 14 Pages.

* cited by examiner

IDENTIFYING SERVICE ISSUES BY ANALYZING ANOMALIES

BACKGROUND

In order to optimize performance of various programs and resolve service issues, developers and service administrators traditionally seek to find and remove sources of problems and failures of a software product. To achieve this, software programs are often provided with error reporting services that are configured to allow information regarding various problems to be collected and communicated to developers and administrators. When a failure or error occurs, the error reporting service can collect information about the operating conditions on the computer leading up to the error. This information, along with similar error reports from other computers executing the same application, may be sent to a central server, creating a database of failure that can be analyzed to identify software bugs that can be corrected.

Given the significant number of users and complexity of computer networks, the number of error reports received is often too large to collect and review. However, a sizable portion of the error reports may relate to transient or insignificant errors. Because of the copious number of errors, the amount of resources required to review and analyze all the error reports to distinguish errors requiring attention from those that are transient and will be resolved by themselves is difficult and cost prohibitive.

Thus, there remain significant areas for new and improved ideas for collecting and analyzing data relating to errors and failures.

SUMMARY

In one general aspect, the instant application describes a device having one or more processors and a memory in communication with the one or more processors, wherein the memory comprises executable instructions that, when executed by the one or more processors, cause the device to perform multiple functions. These functions may include collecting data from a computing environment, identifying a plurality of anomalies in the computing environment based in part on the collected data, grouping the plurality of anomalies into one or more clusters, and classifying each of the one or more clusters based on a plurality of dimensions. The functions may also include assigning a weight to each dimension of the plurality of dimensions for each of the one or more clusters, aggregating the weights assigned to each dimension to calculate a score for each of the one or more clusters, and generating a ranking for each of the one or more clusters base in part on the calculated score. After the rankings are generated, one of the clusters may be identified as an outlier anomaly based on the rankings. The plurality of dimensions and the weights assigned to each dimension may be selected by employing machine-learning models.

In yet another general aspect, the instant application describes a method for identifying one or more outlier anomalies in a computer environment. The method may include collecting data from a computing environment, identifying a plurality of anomalies in the computing environment based in part on the collected data, grouping the plurality of anomalies into one or more clusters, and classifying each of the one or more clusters based on a plurality of dimensions. The method may also include assigning a weight to each dimension of the plurality of dimensions for each of the one or more clusters, aggregating the weights assigned to each dimension to calculate a score for each of the one or more clusters, and generating a ranking for each of the one or more clusters base in part on the calculated score. After the rankings are generated, one of the clusters may be identified as an outlier anomaly based on the rankings. The plurality of dimensions and the weights assigned to each dimension may be selected by employing machine-learning models.

In a further general aspect, the instant application describes a non-transitory computer readable medium on which are stored instructions that when executed cause a programmable device to collect data from a computing environment, identify a plurality of anomalies in the computing environment based in part on the collected data, group the plurality of anomalies into one or more clusters, and classify each of the clusters based on a plurality of dimensions. The programmable device may also assign a weight to each dimension of the plurality of dimensions for each of the one or more clusters, aggregate the weights assigned to each dimension to calculate a score for each of the one or more clusters, and generate a ranking for each of the one or more clusters base in part on the calculated score. After the rankings are generated, one of the clusters may be identified as an outlier anomaly based on the rankings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, byway of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In an example, this description is related to technology implemented for an improved method and system of identifying outlier anomalies in computer environments by analyzing detected anomalies using a multi signal consolidation model. To improve the current methods of handling service issues and regressions, a method and system is used to utilize an environment's telemetry system, change system, historical data, and/or network infrastructure footprint to dynamically detect outlier anomalies that may correspond with regressions. This may be done via dynamically built machine-learning models that monitor multiple telemetry streams and use various algorithms and data patterns to group detected anomalies into one or more clusters, and classify and correlate the clusters based on one or more dimensions including change events (for example code deployment events) to dynamically identify regressions and anomalies that represent issues requiring attention. This can significantly reduce the number of reported errors in a computer environment to only those most likely requiring attention. As a result, the solution provides an efficient and accurate method by which outlier anomalies and regressions can be identified and addressed.

As will be understood by persons of skill in the art upon reading this disclosure, benefits and advantages provided by such implementations can include, but are not limited to, a solution to the technical problems of inefficient, cost prohibitive, labor intensive and unreliable error and failure detection mechanisms provided in computer environments. Technical solutions and implementations provided here optimize and improve the process of analyzing anomalies to identify failures requiring attention. The benefits provided by these solutions include providing increased efficiency, accuracy, and reliability in detecting and responding to system errors and failures, and reducing the amount of human labor and oversight needed for such processes.

Figure 1:
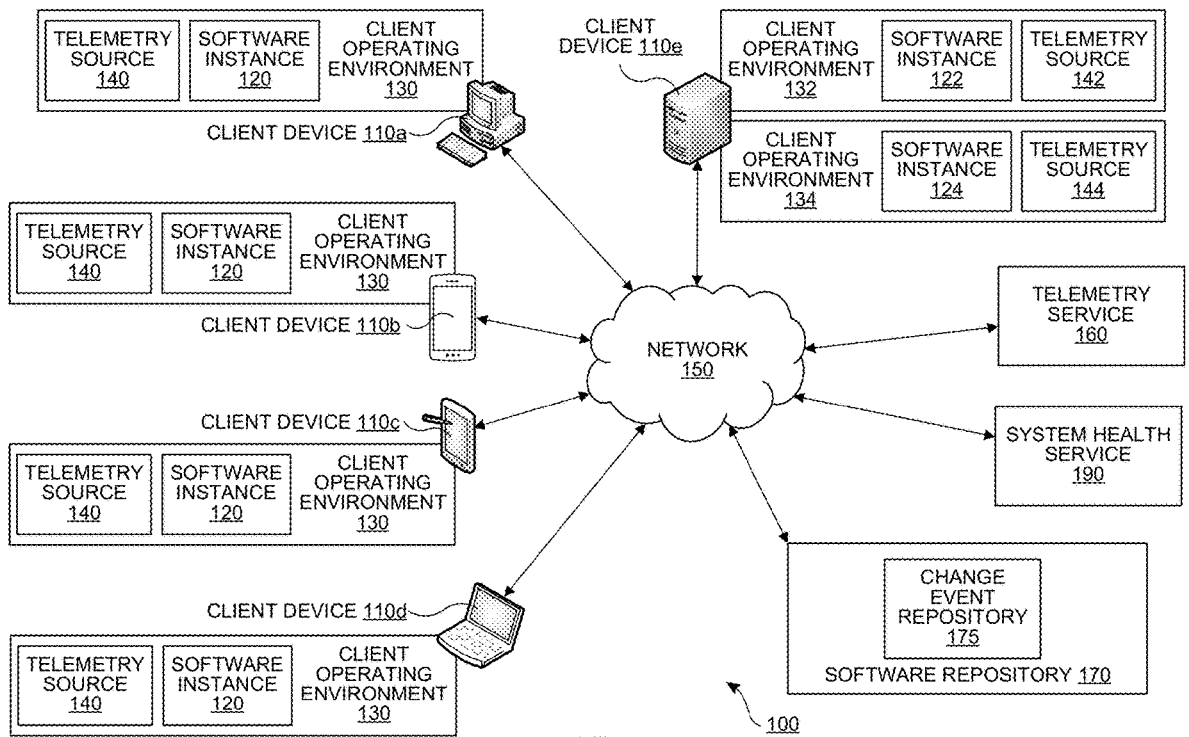
FIG. 1 is a conceptual illustration of an example system upon which aspects of this disclosure may be implemented.

FIG. 1 illustrates a high-level system (system) 100 in which some of the proposed techniques described herein may be implemented. The system 100 may include a number of client computing devices 110. In different implementations, one or more of the client devices 110 may communicate with a telemetry service 160 via a data communication network 150. Each client device 110 may be any suitable computing device capable of executing computer instructions, such as, but not limited to, a desktop computer 110a, smartphone 110b, a tablet computing device 110c, a notebook computer 110d, and a server computing system 110e.

In the example illustrated, the system 100 includes a single instance of a number of different types of computing devices 110, each having its own respective performance characteristics. However, this disclosure is not limited in this respect, and the techniques described herein can be used to collect and analyze information from a single computer, a set of multiple homogeneous types of computers, and/or with any number of instances of any number of different types of computers. Furthermore, the system 100 may include multiple server farms each having their own set of computing devices.

In one implementation, the client devices 110 may each provide one or more of a client operating environment 130 (which may be referred to as an operating environment), in which a respective software instance 120 of an installed base of a software component and a telemetry source 140 are executed by the client device 110. Each of the client devices 110a, 110b, 110c, and 110d may include an operating environment 130 as well as a software instance 120 and a telemetry source 140. An operating environment 130 may include hardware components of its respective client device 110 and resources (including, for example, allocated amounts of partial resources) provided by the client device 110 for execution of the software instance 120 such as, but not limited to, compute (processor type, number of cores or processors, processor frequency, etc.), memory, storage, and network hardware and resources.

As a general matter, a software component may be any suitable type or types of software, and may include any suitable set of computer-executable instructions implemented or formatted in any suitable manner. Software components may be implemented as application software, although the techniques described herein are applicable to other types of software components, such as system software (e.g., components of an operating system).

In some implementations, a client device 110 may provide multiple operating environments 130 and/or software instances 120. An example of this is depicted with reference to the server computing system 110e, which includes a first operating environment 132 with a first software instance 122 and a first telemetry source 140, as well as a second operating environment 134 and a second software instance 124 and a second telemetry source 144. In some implementations, multiple operating environments operate concurrently, while in other implementations, they operate at different times, and/or with different configurations. For example, each of the first operating environment 132 and second operating environment 134 may be associated with two different user accounts. The first operating environment 132 and second operating environment 134 may be virtualized operating environments, such as but not limited to virtual machines, containers, or jails. In some implementations, a single telemetry source 140 may be used for multiple operating environments 130 of a client device 110.

The telemetry service 160 may be configured to collect telemetry data items received from the telemetry sources 140 and to detect anomalies in the system. Because the number of anomalies detected by the telemetry service 160 may be significantly large in any given time frame, it may be difficult to review and respond to each detected anomaly. The system health service 190 may be configured to receive the collected telemetry data including information relating to detected anomalies and/or clustering information related to the anomalies from the telemetry service 160 and make use of the received data items to correlate groups of detected anomalies with telemetry data and other information such as data received from software repository 170 to diagnose regressions and identify anomalies that require attention. The software repository 170 may facilitate distribution of updated software components, such as software installation package(s) and/or software update package(s) to the client devices 110. As a result, software repository 170 may have access to a change events repository 175 which may store a list of change events in the system 100. In one implementation, the system health service 190 may be configured to perform a machine-based analysis of received telemetry data items to apply certain rules to grouped anomalies to identify outlier anomalies requiring attention.

Figure 2:
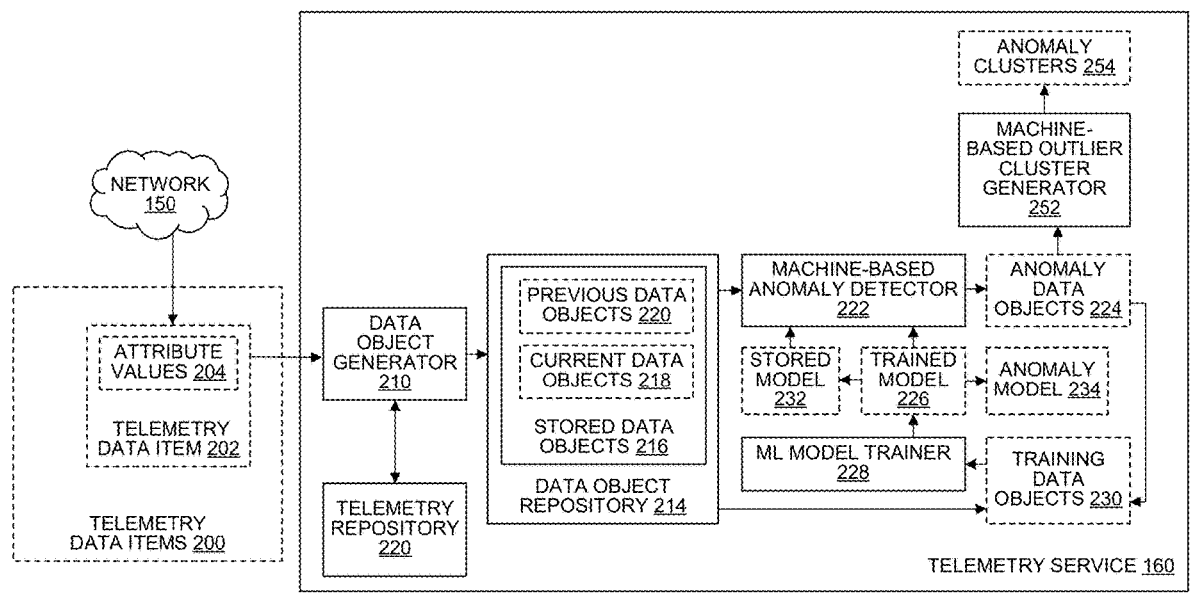
FIG. 2 is a conceptual diagram illustrating an implementation of a distributed computing environment architecture for managing a telemetry data service.

Referring now to FIG. 2, an example implementation of the telemetry service 160 is presented. As discussed above, the telemetry service 160 may be configured to receive via the network 150 telemetry data items 200 from telemetry sources 140 executing on the client devices 110. The telemetry data items 200 may include one or more telemetry data item 202 each providing a set of one or more attribute values 204.

As a general matter, there may be two broad types of attributes for which telemetry data is received. For purposes of reference, the first type of attributes will be referred to as performance attributes (which may also be referred to as performance measurements) and the second type of attributes will be referred to as context attributes. Some examples of performance attributes include, but are not limited to, (1) call flow measurement; (2) logging events during software execution; (3) receiving an invocation message indicating invocation of an application programming interface (API); (4) network packet loss; (5) bandwidth; (6) heap allocation; (7) power; (8) boot time; (9) exception paths in code; (10) UI render/update times (user-perceived latency); (11) storage transaction latency measurements for selected operations; (12) latency measurements for performing selected operations; (13) unexpected failure rate; (14) availability; (15) number of times a user interacted with a given UI element or feature of a software instance, and other such parameters associated with the operation of the software instance. Some examples of context attributes can include (1) operating environment information; (2) software version (for example, a version identifier or whether a debug or retail version); (3) a build number of the software; (4) hardware information associated with a client device (for example, platform type and hardware component details); (5) software environment information associated with an operating environment; (6) computer network environment (for example a server farm); (7) user, customer, and/or organization information (for example, such information that does not include personally identifiable information); (8) operating system details (for example, type of OS, version identifier, etc.); (9) information about other software products that are also executing within the operating environment; and (10) other attributes associated with the client device on which the software instance is installed.

For purposes of clarity, it can further be understood that context attributes can be designated as either dynamic or static. A static context attribute may either have a fixed value for a client operating environment or may reasonably be expected to remain unchanged during a telemetry data collection period. A dynamic context attribute may encompass values that are not static. In other words, dynamic context attributes may be changeable, and/or likely to change over the telemetry data collection period.

In some implementations, there is an ongoing collection of telemetry data items 202 from across a large population of telemetry sources 140. As a result, the telemetry data items 200 as a whole are able to provide an understanding as to how the software instances 120 perform in a more diverse range of operating environments and situations. With this more diverse information, an understanding of what is normal performance can adjust over time, and new issues are more likely to be detected. The telemetry data items 202 provide attribute values 204 for a set of attributes that may be selected based on their general effectiveness for detecting new performance issues, such as significant negative changes in performance, across a broad and diverse population of telemetry sources 140.

In different implementations, attribute values 204 can include one or more performance attribute values for respective performance attributes measuring performance of one or more operations performed by a software instance 120. Furthermore, attribute values 204 can also include one or more context attribute values for respective context attributes. In some implementations, a telemetry data item 202 and/or its respective attribute values 204 may be provided to a data object generator 210 of telemetry service 160.

In one implementation, the telemetry service 160 may be configured to provide a received telemetry data item 202 or its respective attribute values 204 to a data object generator 210, which may be further configured to generate a new data object for the telemetry repository 220. The data object generator 210 may be configured to generate a new data object for the telemetry repository 220. In some examples, the data object generator 210 is configured to generate an attribute value for the new data object based on one or more attribute values of a telemetry data item 200. As one example, an attribute value 204 may simply need to be changed or transformed from a first format or encoding to a different format or encoding that will be used for the new data object. As another example, an attribute value for the new data object may be generated by applying one or more mathematic and/or logic operations to one or more of the attribute values. In some cases, the new data object may not include values for certain attributes not applicable to certain telemetry sources 140 due to software, hardware, and/or situational limitations. For example, the corresponding software instance 120 and/or client operating environment 130 may lack associated features, be unable to provide the underlying data for an attribute, or related operations may not have been performed during a period of time associated with a telemetry data item 200. As shown in FIG. 2, in different implementations, the telemetry service 160 is configured to provide the new data object to a data object repository 214, which is further configured to store and maintain the received new data object as one of multiple stored data objects 216.

In different implementations, the data object repository 214 is also configured to receive a request for specific information, retrieve information from the stored data objects 216 responsive to the request, and provide the retrieved information in response to the request. The provided information may be in the form of structured data object records and/or attribute values from responsive stored data objects 216. In some examples, the data object repository 214 includes a database system capable of processing complex queries on the stored data items 214.

In addition, a machine-based anomaly selector 222 may be configured to select a set of training data objects 230, for example a set of current data objects 218 can be selected, and the training data objects 230 provided to an machine-learning (ML) model trainer 228 to produce, generate, and/or update a trained model 226 that is used by the machine-based anomaly detector 222. The trained model 226 may be used to select outlier data objects 224 from the current data objects 218 currently being analyzed by the machine-based anomaly detector 222. In some implementations, the trained model 226 may be retained as a stored model 232 for subsequent use by the machine-based anomaly detector 222 to identify anomaly data objects 224 for additional analysis operations. The telemetry service 160 may be configured to select the current data objects 218 based on the goals of the analysis performed by the machine-based anomaly detector 222. In some examples, a corresponding request may be limited to a stored data objects 216 corresponding to a specified period of time; for example, only stored data objects 216 for the last hour may be requested. In some examples, the stored data objects 216 may be requested based on the values of one or more specified attributes; for example, it may be desired to focus the analysis on one particular server farm.

In some implementations, the ML model trainer 228 uses an unsupervised machine learning technique on unlabeled training data objects 230 to generate the trained model 226. A number of such techniques are available for performing detection of anomaly data objects within or based on a larger set of data objects.

A threshold value may be used in connection with the local anomaly factors to select a population of anomaly data objects 224 of various sizes. There are also a variety of density-based clustering approaches that can be similarly applied. For example, techniques such as, but not limited to, DBSCAN and OPTICS and variations thereupon can be used to identify one or more clusters of data objects within the training data objects 230. In some implementations, the residual training data objects 230 not assigned to any of the resulting clusters, or a selected subject of the residual training data objects 230, may be selected as the anomaly data objects 224.

Many density-based approaches produce models described in terms of individual data objects and respective values determined by the ML model trainer 228 in the course of generating the trained model 226, in contrast to parametric model definitions not directly linked to individual training data objects 230. Thus, for such density-based approaches it is useful to retain the resulting trained model 226 as stored model 232 in order to make later use of the understanding of combinations of attributes that were previously determined to be normal. For example, the ML model trainer 228 may be configured to use the stored model 232 and its associated data objects as an initial model to which newer training data objects 230 can be incorporated, resulting in a trained model 226 that reflects characteristics of both the more recent current data objects 218 used as the current set of training data objects 230 and previous data objects 220 used to generate the stored model 232. This results in a trained model 226 that more gradually adapts to changing population characteristics, rather than immediately interpreting a poorly performing subpopulation as being abnormal.

Various other clustering machine learning techniques may be applied to generate the trained model 226 from the selected training data objects 230. For example, techniques such as, but not limited to, Gaussian Mixture Models (GMM), hierarchical models, and variants thereof may be used to generate cluster definitions. The anomaly data objects 224 may be selected based on their lack of correspondence and/or degree of a lack of correspondence to some or all of the clusters identified in the trained model 226. In some examples, data objects that do not fall into the identified clusters or a selected subset of the identified clusters may be selected as anomaly data objects 224. For a probabilistic trained model 226, one or more probability values may be specified and adjusted in order to adjust the number of anomaly data objects 224.

In some implementations, the telemetry service 160 may provide functions that automate and/or facilitate the identification of clusters of the outlier data objects 224. For example, the telemetry service 160 may include a machine-based cluster identifier 252 configured to receive the anomaly data objects 224 and apply machine learning techniques (for example, an unsupervised clustering technique) to identify one or more anomaly clusters 254. The applied machine-learning techniques provide more effective and reliable identification of significant clusters within a large number of high-dimensional anomaly data objects 224 (for example, having 10 or more attributes) than with conventional approaches. Thus, the machine-based anomaly cluster generator 252 gives an improved ability to recognize new or evolving issues (which might have been missed using conventional approaches) and determine how to effectively and precisely target relevant telemetry sources 140.

Figure 3:
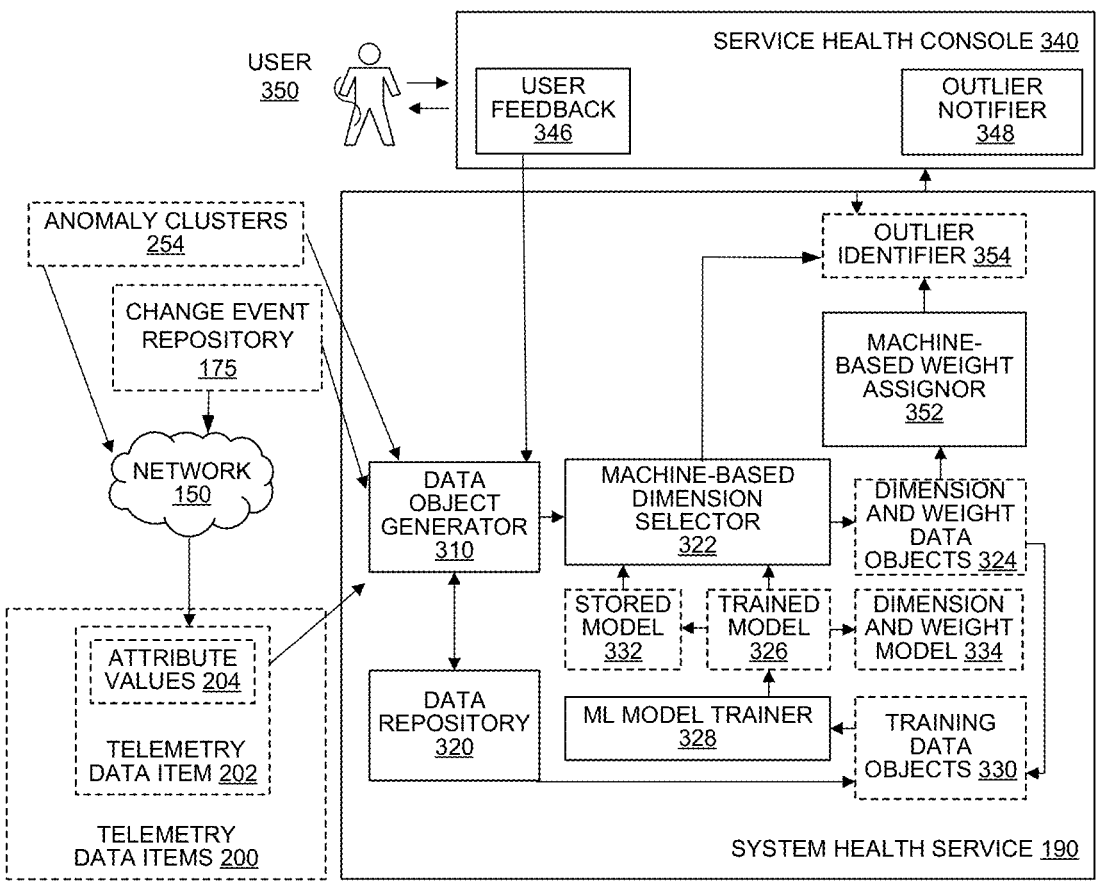
FIG. 3 is a conceptual diagram illustrating an implementation of a distributed computing environment architecture for managing a system health service

Referring now to FIG. 3, an example implementation of the system health service 190 is presented. As discussed above, the telemetry service 160 may be configured to receive via the network 150 telemetry data items 200 from telemetry sources 140 executing on the client devices 110. In this example, the system health service 190 may also receive change event data from a change event repository 175, data relating to identified anomaly clusters 254 from the telemetry service 160, and user feedback data via a service health console 340.

In one implementation, the system health service 190 may be configured to store at least some of the data provided by the telemetry data items 200, change event repository 175, anomaly clusters 254, and user feedback 246 in a data repository 320. In one implementation, at least some of this data may be used by the data object generator 310 to generate new data objects to be used in the system health service 190. The new data objects and data objects stored in the data repository 320 may be used to provide data objects for ML models and trainers used in the system health service 190. For example, a machine-based dimension selector 322 may receive data objects from the data repository and/or the data object generator and use those among other inputs to select a set of dimensions for a given anomaly cluster. The machine-based dimension selector 322 may also be configured to select a set of training data objects 330 to be provided to an ML model trainer 328 to produce, generate, and/or update a trained model 326 that is used by the machine-based dimension selector 322. The trained model 326 may be used to select dimension and/or weight data objects 324 from data objects currently being analyzed by the machine-based dimension selector 322.

In some implementations, the trained model 326 may be retained as a stored model 332 for subsequent use by the machine-based dimension selector 322. Many density-based approaches produce models described in terms of individual data objects and respective values determined by the ML model trainer 328 in the course of generating the trained model 326. For such density-based approaches it may be useful to retain the resulting trained model 326 as stored model 232 in order to make later use of the understanding of anomalies that were previously determined to be normal. For example, the ML model trainer 328 may be configured to use the stored model 332 and its associated data objects as an initial model to which newer training data objects 330 can be incorporated, resulting in a trained model 326 that reflects characteristics of both more recent current data objects used as the current set of training data objects 330 and previous data objects used to generate the stored model 332. This results in a trained model 326 that more gradually adapts to changing population characteristics, rather than immediately interpreting a poorly performing subpopulation as being abnormal.

The system health service 190 may also provide functions that facilitate the determination of what weightage should be assigned to selected dimensions for a given cluster. For example, the system health service 190 may include a machine-based weight assignor 352 configured to receive the dimension and weight data objects 324 and apply machine learning techniques (for example, an unsupervised clustering technique) to determine weightage to be assigned to one or more selected dimensions. As a result of utilizing machine-learning techniques, more effective and reliable identification of significant clusters within a large number of anomaly clusters may be achieved. Information from the machine-based dimension selector 322 and the machine-based weight assignor 352 may be used, as discussed further below, by an outlier identifier 354 to identify outliers in the system. Thus, system health service 190 may be able to provide an improved ability to recognize new or evolving issues (which might have been missed using conventional approaches) and determine how to effectively and precisely target relevant telemetry sources 140.

In some implementations, a user 350 (likely a software developer or an administrator) may make use of the service health console 340 to be notified of the outlier identified by the outlier identifier 354 via an outlier notifier 348. The outlier notifier 348 may notify the user 350 upon determining that there is an issue that needs attention.

Figure 4:
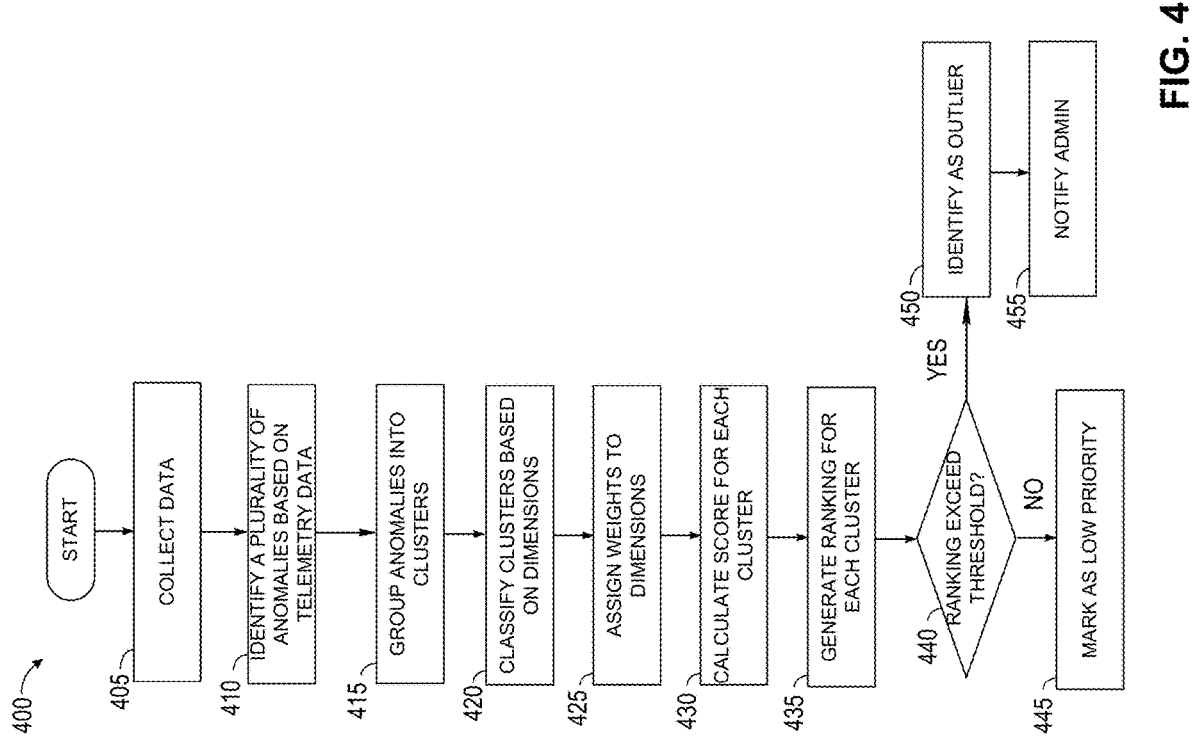
FIG. 4 is a flow diagram showing an example method for an improved process of identifying outlier anomalies in a computer environment.

FIG. 4 depicts a flow diagram showing an example method 400 for an improved process of identifying outlier anomalies in a computer environment. At 405, the method 400 starts by proceeding to collect data for a computer environment or system such as system 100 of FIG. 1, at 410. As discussed above, the data may include telemetry data in the form of attributes collected from one or more client devices. Additionally, the collected data may include other information that can help in categorizing and correlate anomalies with causes. In an example, this information may include change event data collected from one or more services such as a software repository, historical data relating to past anomalies, and user feedback. The historical data may be stored in a data store in communications with or included in a server(s) conducting the system health service. The historical data may be gathered overtime as the service identifies and categorizes system anomalies. For example, it may include information on how often certain anomalies have occurred in the past, what geographical locations and/or server farms they have occurred at and whether or not they were linked to any previous change events or other system events (for example, a power outage in a farm). In one implementation, the historical data may be collected and stored as part of telemetry data by the telemetry service. User feedback information may include how a developer/administrator has categorized an anomaly. For example, if a developer indicates that an anomaly that was recently tagged as an outlier was in fact a glitch in the system and did not require follow up action, the information may be stored in a user feedback data store or as part of historical data and/or telemetry data to use in future analysis.

In one implementation, the data may be collected for a predetermined amount of time before, method 400 proceeds to process the data. For example, the data may be collected in batches specified by a time interval (e.g., one-hour time frames). In such an implementation, the steps following the collection of data may be performed once in each time frame.

After all relevant information has been collected (for example for a given time frame), method 400 may proceed to identify a plurality of anomalies in the system, at 410, based on the collected telemetry data. For example, attributes collected from the one or more client devices may be examined to determine if they indicate unexpected failure, unexpected latency, network packet loss, and the like. Once anomalies are identified, method 400 may utilize one or more algorithms (for example ML based models and algorithms discussed above) to group the identified anomalies into one or more clusters, at 415. The one or more clustered anomalies may be referred to as peer groups that group together the same type of anomalies for processing and analysis. In an example, the clustering operation extracts unique operations and farm labels and from this unique list extracts unique environments that correspond to unique anomalies.

After the clusters are identified, they may be classified based on one or more dimensions, at 420. The dimensions may include telemetry data, change events, historical data, and the like. For example, attributes such as reliability quality of server (QoS), unexpected failure, and usage may be used as dimensions. Other dimensions may include computer environment (for example farm label), size of the cluster, operation, rate of recurrence (for example whether the anomaly is new or recurring), and the like. In one implementation, classifying the clusters based on dimensions may include determining if a dimension applies to a cluster. Determining what dimensions to use and apply to a given cluster may be based on machine-learning rules and models. For example, if test results for a given change event are available and algorithms determine that there is a likelihood the anomaly may be related to the change event, the test results may be analyzed and used as a dimension.

Once a given cluster is classified based on the different applicable dimensions, method 400 may proceed to assign weights to each dimension for the cluster, at 425. The weights assigned to each dimension may vary and the determination of how to assign them and what weight to assign to each dimension may be based on one or more rules. The rules may be predetermined or may change based on machine-learning models. For example, historical data may be used to train ML models for assigning weightage to the current cluster. In an example, the weights assigned to a dimension may be correlated with weights assigned to other dimensions. For example, if more than one farm causes the anomaly but there is no recent change event that occurred at all farms at which the anomaly was detected, the weight given to the size of the cluster may be lower than when each farm at which the anomaly is detected also included a similar recent change event.

After weights are assigned to the appropriate dimensions for each cluster, a score may be calculated for the cluster, at 430. In some implementations, a score may first be calculated for each dimension by multiplying the number of anomalies in a cluster by the weight assigned to the dimension for that cluster. The scores for each dimension assigned to a cluster may then be added together to calculate a total score for the cluster. In one implementation, the calculated scores along with their underlying data may be stored in a data store for future access and use.

Once the clusters identified in a time interval have total scores calculated for them, method 400 may proceed to generate a ranking for each identified cluster in the system. In one implementation, the ranking can be generated by sorting the total scores in a descending order to identify the top scoring clusters. Other methods of generating rankings may also be employed. For example, approaches similar to adjacency matrix may be employed to compute the rankings and statistical trend estimation may be utilized to identify trend pulses in the system.

After rankings are generated, a threshold may be used to identify which one of the clusters should be categorized as outliers needing attention. The threshold may be predetermined by for example a developer or administrator. Alternatively, the threshold may be adjustable and/or determined by the system health service based on one or more factors. In an example, the threshold may be set at 2% indicating that clusters ranked in the top 2% are identied as outliers. Thus, method 400 may determine, at 440, whether the ranking for a given cluster exceeds the threshold. When the ranking does not exceed the threshold, then the cluster may be marked as low priority, at 445. This may indicate that the cluster does not need attention (for example it is transient and not caused by an issue needing attention). In one implementation, the ranking and categorization of the cluster as not requiring attention may be stored in a data store for future reference. The process of determining if a cluster exceeds the threshold may be repeated for each cluster. Alternatively, method 400 may categorize all clusters exceeding the threshold in one category and those not exceeding the threshold in another, at the same time.

When it is determined, at 440, that the ranking of a cluster exceeds the threshold (for example, the cluster has a ranking in the top 1%), the cluster may be identified as an outlier, at 450. Method 400 may then proceed to notify one or more administrators or developers, at 455. This may involve notifying the administrators that an outlier anomaly requiring attention has been detected by for example presenting a pop-up screen on their user interface, sending them an email, a text message or any other notification method. After receiving the notification, once the administrator has returned to the health service application, a screen may be presented to them with the top-ranking anomalies. In one implementation, the service may determine which developers or administrators need to be notified for each identified outlier anomaly. The results may include the identified anomaly and/or telemetry data or any other relevant information. In one implementation, the results shown may be customizable. For example, the administrator/developer may select what information he/she wishes to review.

Thus, in different implementations, one or more machine learning models can be developed and used that are configured to identify anomalies in a computer system, to cluster the identified anomalies into groups, classify the clusters based on one or more dimensions and assign weights to each of those dimensions. The weights and dimensions may then be used to calculate a score and generate a ranking of the identified clusters to determine which one of the anomalies in the systems are outliers and/or may correspond to regressions requiring attention. This process may significantly reduce the number of system failures and errors reported to developers and administers and identify which ones correspond to problems needing attention. This increases productivity and efficiency and improved customer experience as it may administers/developers to quickly identify problems that need addressing.

Figure 5:
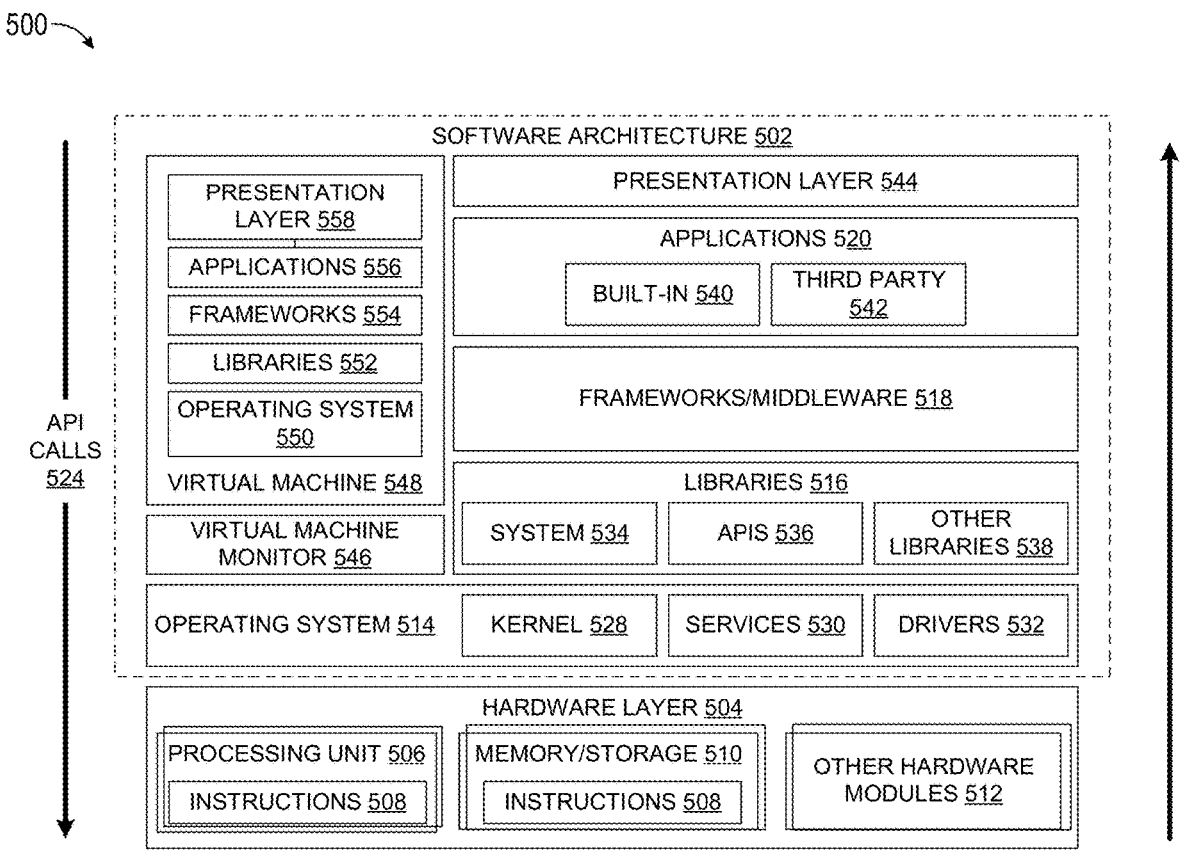
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 520 and/or third-party applications 522. Examples of built-in applications 520 may include, but are not limited to, a contacts application, a browser application, a location application, a media application, a messaging application, and/or a game application. Third-party applications 522 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 528 provides an execution environment where applications/modules can execute as if they were executing on a hardware machine (such as the machine 600 of FIG. 6, for example). The virtual machine 528 may be hosted by a host OS (for example, OS 514) or hypervisor, and may have a virtual machine monitor 526 which manages operation of the virtual machine 528 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
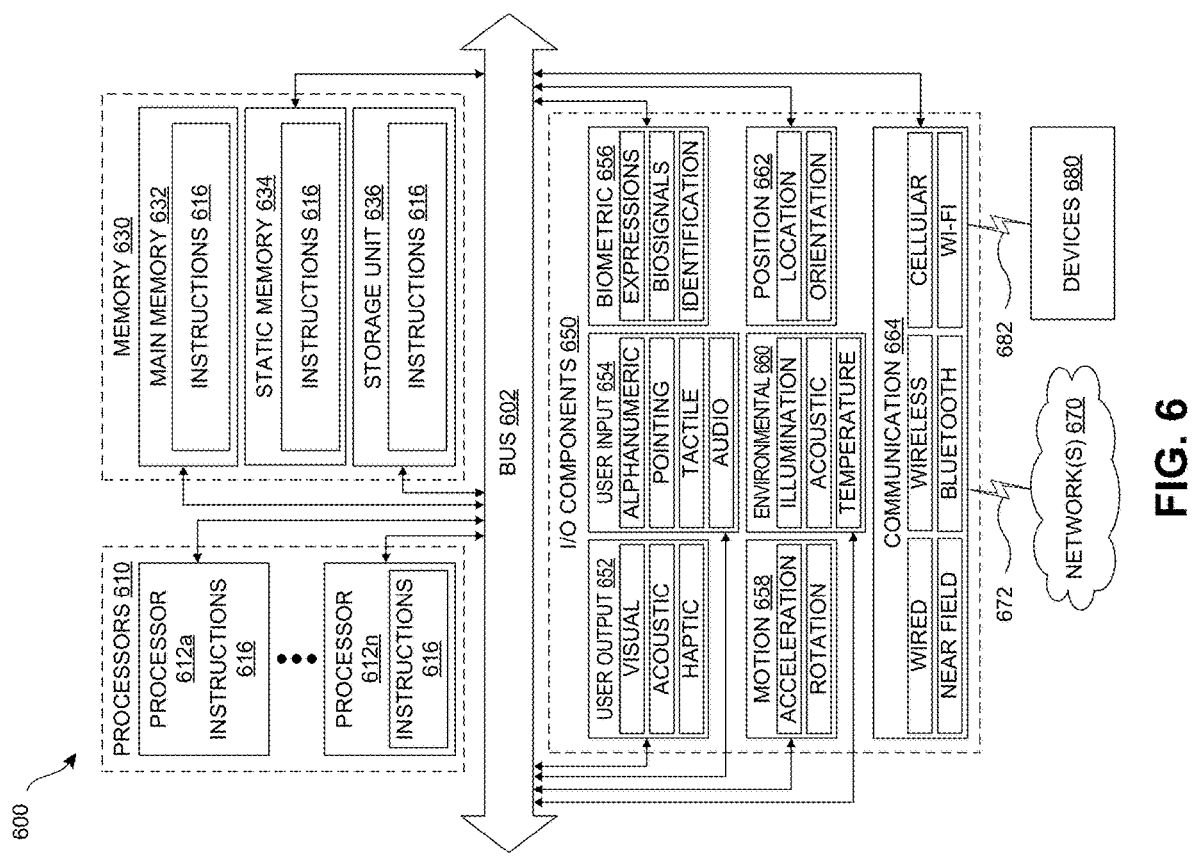
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any otherfeature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

The detailed examples of systems, devices, and techniques described in connection with FIGS. 1-4 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between oramong two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory storing instructions that when executed by the processor, cause the processor to perform functions of:
collecting data from a computing environment via a network, the data including telemetry data and change event data;
inputting the telemetry data into a first machine-learning (ML) model to identify a plurality of anomalies in the computing environment based at least in part on the telemetry data;
obtaining the identified plurality of anomalies as an output from the first ML model;
grouping the plurality of anomalies into one or more clusters;
classifying each of the one or more clusters based on a plurality of dimensions, the plurality of dimensions being determined by a second ML model,
assigning a weight to each dimension of the plurality of dimensions for each of the one or more clusters;
aggregating the weights assigned to each dimension to calculate a score for each of the one or more clusters;
generating a ranking for each of the one or more clusters based in part on the calculated score;
based on the ranking, identifying at Last one of the one or more clusters as an error requiring attention; and
transmitting data relating to the at least one of the one or more clusters for notifying a user,
wherein the plurality of dimensions includes a dimension for change events.

2. The data processing system of claim 1, wherein the executable instructions when executed by the one or more processors, further cause the data processing system to perform functions of:

determining if the ranking of a cluster in the one or more clusters is outside a range identified by a threshold; and
identifying the cluster as the error requiring attention when the ranking is outside the range.

3. The data processing system of claim 2, wherein the executable instructions when executed by the one or more processors, further cause the data processing system to perform functions of notifying the user that the cluster requires attention.

4. The data processing system of claim 1, wherein the dimensions are derived from the data.

5. The data processing system of claim 1, wherein grouping the plurality of anomalies into the one or more clusters is performed by employing a third ML model.

6. The data processing system of claim 1, wherein the data includes historical data.

7. A method for identifying one or more outlier anomalies in a computing environment, the method comprising:
collecting data from the computing environment via a network, the data including telemetry data and change event data;
inputting the telemetry data into a first machine-learning (ML) model to identify a plurality of anomalies in the computing environment based at least in part on the telemetry data;
obtaining the identified plurality of anomalies as an output from the first ML model;
grouping the plurality of anomalies into one or more clusters;
classifying each of the one or more clusters based on a plurality of dimensions, the plurality of dimensions being determined by a second ML model;
assigning a weight to each dimension of the plurality of dimensions for each of the one or more clusters;
aggregating the weights assigned to each dimension to calculate a score for each of the one or more clusters;
generating a ranking for each of the one or more clusters based in part on the calculated score;
based on the ranking, identifying at Last one of the one or more clusters as an outlier anomaly; and
transmitting data relating to the at least one of the one or more clusters for notifying a user,
wherein the plurality of dimensions includes a dimension for change events.

8. The method of claim 7, further comprising:
determining if the ranking of a cluster in the one or more clusters is outside a range identified by a threshold; and
identifying the cluster as the error requiring attention when the ranking is outside the range.

9. The method of claim 8, further comprising notifying the user that the cluster requires attention.

10. The method of claim 7, wherein the data includes historical data.

11. The method of claim 7, wherein the weight assigned to each dimension is determined by employing a third ML model.

12. The method of claim 7, wherein grouping the plurality of anomalies into the one or more clusters is performed by employing a third ML model.

13. A non-transitory computer readable medium on which are stored instructions that when executed cause a programmable device to:
collect data from a computing environment via a network, the data including telemetry data and change event data;
inputting the telemetry data into a first machine-learning (ML) model to identify a plurality of anomalies in the computing environment based at least in part on the telemetry data;
obtain the identified plurality of anomalies as an output from the first ML model;
group the plurality of anomalies into one or more clusters;
classify each of the one or more clusters based on a plurality of dimensions, the plurality of dimensions being determined by a second ML model;
assign a weight to each dimension of the plurality of dimensions for each of the one or more clusters;
aggregate the weights assigned to each dimension to calculate a score for each of the one or more clusters;
generate a ranking for each of the one or more clusters based in part on the calculated score;
based on the ranking, identify at Last one of the one or more clusters as an outlier anomaly; and
transmitting data relating to the at least one of the one or more clusters for notifying a user,
wherein the plurality of dimensions includes a dimension for change events.

14. The non-transitory computer readable medium of claim 13, wherein the instructions further cause the programmable device to: determine if the ranking of a cluster in the one or more clusters is outside a range identified by a threshold; and identify the cluster as the error requiring attention when the ranking is outside the range.

15. The non-transitory computer readable medium of claim 14, wherein the instructions further cause the programmable device to notify the user that the cluster requires attention.

16. The non-transitory computer readable medium of claim 13, wherein the data comprises historical data and user feedback.

17. The non-transitory computer readable medium of claim 13, wherein the dimensions are derived from the data.

18. The non-transitory computer readable medium of claim 13, wherein the weight assigned to each dimension is determined by employing a third ML model.

19. The non-transitory computer readable medium of claim 13, wherein grouping the plurality of anomalies into one or more clusters is performed by employing a third ML model.

* * * * *